July 18, 1961

T. M. BALL 2,992,643

FUEL SYSTEMS

Filed April 24, 1959

INVENTOR.
Thomas M. Ball
BY
Harness and Harris
ATTORNEYS.

July 18, 1961

T. M. BALL 2,992,643

FUEL SYSTEMS

Filed April 24, 1959

INVENTOR.
Thomas M. Ball.
BY Harness and Harris
ATTORNEYS.

2,992,643
FUEL SYSTEMS
Thomas M. Ball, Bloomfield Hills, Mich., assignor to Chrysler Corporation, Highland Park, Mich., a corporation of Delaware
Filed Apr. 24, 1959, Ser. No. 808,767
17 Claims. (Cl. 123—119)

This invention relates to a fuel injection system of the type disclosed in the related copending application of Thomas M. Ball et al. Serial No. 751,999, filed July 30, 1958, assigned to the assignee of this application, for use on internal combustion engines and in particular on those engines which utilize ram type manifolds. The system is particularly designed to compensate fuelwise for the added air flow to the engine due to the ram effect of said manifolds.

This application is a continuation-in-part of my application Serial No. 751,920 entitled Fuel Injection System filed July 30, 1958.

The invention will be described as applied to a multi-cylinder engine having a separate intake conduit for each cylinder and a separate throttle in each conduit, but it will be understood that the novel features of this invention are not limited for use with such construction but have utility for engines having a greater or lesser number of cylinders and differently arranged manifold conduits and throttles.

The advent of ram manifolds of the type disclosed in Patent No. 2,791,205 assigned to the assignee of this application has created the problem of supplying additional fuel to the engine in an equal proportion to the additional amount of air rammed into the engine by the ram manifold. This is necessitated by the fact that over the speed range of the engine, the proportion of fuel to air necessary for optimum combustibility and engine performance is substantially constant.

The additional or ram air is caused to flow into the engine cylinders due to the compressibility of the intake air. This compressed air is obtained by the momentum of the incoming intake air which momentum forces or rams the additional air into the cylinders when the piston is at the bottom of its intake stroke. As the piston begins its upward or compression stroke the intake valve closes and traps this compressed air in the cylinder. The air which did not get into the cylinder through the intake valve is compressed against said valve and the intake port associated therewith and through its own resiliency flows back through the intake manifold away from the engine cylinder. This reverse flow causes a momentary vacuum adjacent the intake valve which then causes the air mass in the manifold to once again reverse its direction of flow to cause it to impinge upon the intake valve and port. This reversal in direction of flow of the air mass within the manifold may occur several times during the intake, compression, power, and exhaust stroke cycle of the piston. When the resonance or back and forth motion of the air mass in the intake manifold is tuned in relationship to the piston stroke cycle the air mass will be flowing in the direction of the intake valve when the valve is open and the piston is on its intake stroke. When this condition exists it is said that the air mass in the intake system or manifold is in a harmonically resonantly tuned condition and causes the power and torque output of the engine to be markedly increased. This additional amount of air may become as high as twenty percent of the maximum air flow obtainable without the ram manifold and may result, if additional fuel is not supplied to the engine, in a loss of engine power due to a leaning out of the fuel-air combustion mixture.

The construction of these ram manifolds may be represented by an empirical $$L = \frac{72C}{N} \pm 3$$

formula which sets forth the length of said manifolds necessary to obtain a maximum harmonic resonant tuning of the air intake system at a predetermined engine speed. In this formula, L represents the manifold length in inches from the air entrance of the intake system to the intake valve of the cylinder it feeds measured on the axes of the passages, ports, risers, etc. comprising the intake or inlet system, N is the engine speed in r.p.m. at which the engine output is to peak, and C is the velocity of sound in feet per second in the intake manifold or passage under the particular temperature and pressure conditions expected therein.

It has been found that the aforesaid empirical formula is applicable to engines using fuel injection and gives within practicable limits the air intake passage system length essential for obtaining resonant tuning of the intake system of such an engine. In this connection, it will be understood that no two engines have exactly the same operating characteristics. Moreover, the density of the air-fuel mixture in the air intake stream will vary with different fuels and location of the injection nozzle and the velocity of sound therein will accordingly also vary. However, the overall variations in the velocity of sound under any given set of conditions due to these differences are believed relatively small, usually less than 5%. Hence, where optimum peak power or torque is desired by those in the art, it is recommended that small variations from the calculated value for L be tried until the desired peak is obtained. It has been found that decreases in length will usually increase the engine speed value at which resonance will occur and will show greatest peak power, whereas increases in length will show the greatest peak value for torque.

It is therefore an object of this invention to provide a fuel injection system capable of maintaining a linear relationship between fuel supply and air supply throughout the speed range of an internal combustion engine utilizing ram type intake manifolds.

Another object is to provide a speed and load metering fuel injection for internal combustion engines utilizing ram type intake manifolds with a means to adjust the fuel flow to said engine according to the frequency and amplitude of air pulsations in said manifold.

Another object is to provide a return flow fuel metering system for an internal combustion engine utilizing ram type intake manifolds with a fuel adjusting means responsive to changes in the direction of flow of air in said manifolds to regulate through suitable linkage and valve means the flow of return fuel.

Other objects and advantages will become apparent from the following description and drawings, in which.

Figure 1:
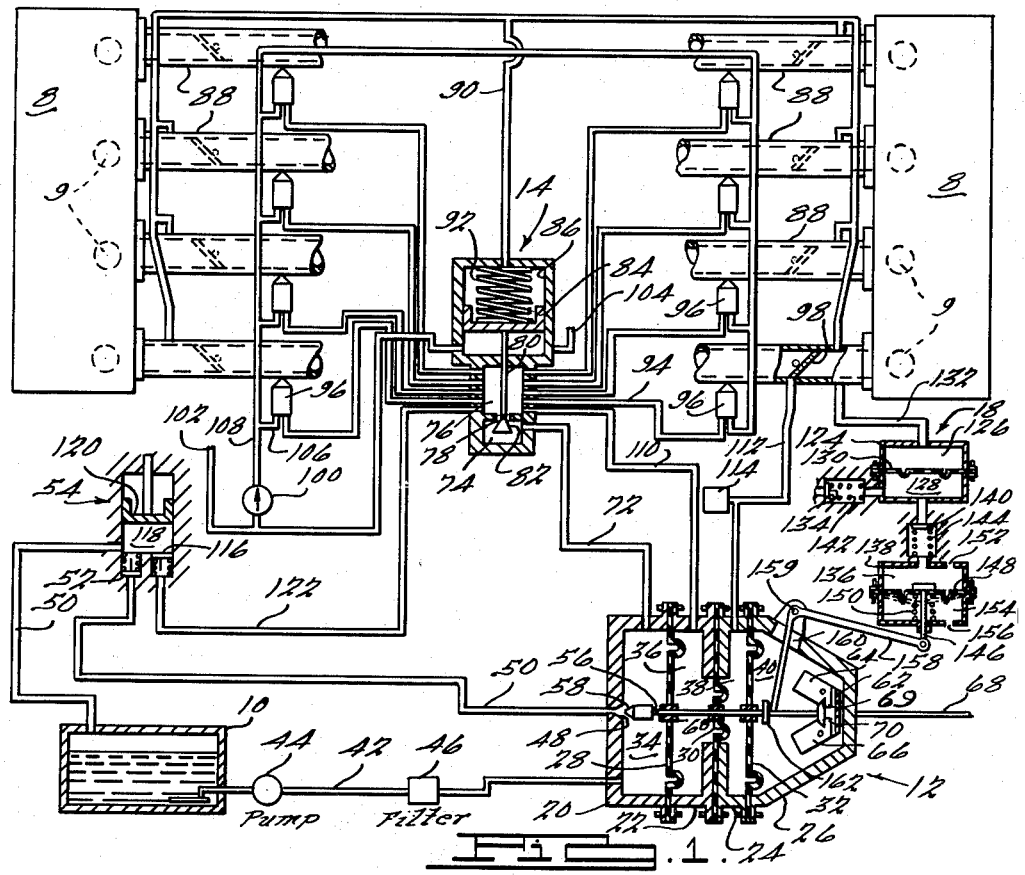
FIGURE 1 represents a view partly in section of a fuel injection system utilizing a fuel adjusting means.

In FIGURE 1 is shown a fuel injection system for an internal combustion engine having separate cylinder banks 8 and cylinders 9, comprising a fuel supply 10, a speed sensor 12, a load sensor 14, an accelerator pump 54, and a fuel adjusting means 18. The speed sensor is provided with four housing portions 20, 22, 24, and 26 separated from each other by diaphragms 28, 30, and 32 respectively to provide chambers 34, 36, 38, and 40. Chamber 34 communicates with fuel supply 10 through conduit 42. A fuel pump 44 in said conduit supplies a substantially constant volume of fuel through filter 46 to chamber 34 during the operation of said engine regardless of the engine load or speed. A return flow metering orifice 48 in said housing portion 20 connects chamber 34 with a return flow conduit 50 which communicates with the inlet check valve 52 of accelerator pump 54. A return flow metering needle 56 having a tapered point 58 is secured to each of said diaphragms by suitable grommets 60.

A flyweight support 62 pivotally supports flyweights 64 and 66 and is secured to a flexible shaft 68 which is operatively connected to the engine to rotate at a speed directly proportional to engine speed. Flyweights 64 and 66 have projections 69 and 70 respectively thereon which abut the end of needle 56 as said flyweights pivot outwardly in response to rotation of shaft 68 to urge needle 56 toward orifice 48 against the force applied in the opposite direction against diaphragm 28 by the fuel in chamber 34.

A conduit 72 connects chamber 34 to the upstream chamber 74 of the load sensor which upstream chamber communicates with a downstream fuel distribution chamber or rosette 76 of the load sensor across a load metering orifice 78. A load metering needle 80, having a reversely tapered portion 82 positioned in orifice 78, is operatively connected to piston 84 reciprocably mounted in cylinder 86, which cylinder operatively communicates with the low pressure portions of each intake manifold 88 on said engine through conduit 90. Low pressure transmitted through conduit 90 will cause piston 84 to be drawn upwardly against the force of spring 92 to thereby urge the tapered end 82 of needle 80 into closer proximity to the sides of orifice 78, and conversely, high pressure in the intake manifolds will tend to urge end 82 of needle 80 to a more open position with respect to orifice 78. A plurality of nozzle feed conduits 94 extend from chamber 76 of the load sensor to an equal number of fuel injection nozzles 96 located upstream of the throttle valves 98 of the individual intake manifold sections 88. The atomizing air supply to the nozzles 96 is obtained from pump 100 through intakes 102 and 104 and is transmitted to the branch air conduits 106 of said nozzles by a main air conduit 108. Chamber 76 of the load sensor is connected to chamber 36 of the speed sensor by conduit 110 to provide an adjustment of the return flow metering needle 56 with respect to orifice 48 based on the pressure differential existing across orifice 78 of the load sensor.

An idle boost conduit 112 communicates with one of said manifold sections 88 at a point adjacent the edge of the throttle valve 98 of that section and with the chamber 38 of the speed sensor. An air bleed valve 114 in conduit 112 is provided to regulate the pressure transmitted to chamber 38 from said manifold section during idling of the engine in order to regulate thereby the speed of the engine at idling. Under normal idling conditions the pressure in chamber 38 is lower than in chamber 40 which is vented to the atmosphere and said pressure in chamber 40 tends to urge the needle 56 toward orifice 48 to retard the flow of return fuel therethrough and provide a sufficient fuel supply for idling. The requirement of this additional boost to needle 56 is due to the fact that at slow engine speed the flyweights are not flung outwardly with sufficient force to negate the frictional resistance of the needle 56 to movement.

The accelerator pump 54 having an inlet check valve 52 and an outlet check valve 116 receives fuel through said inlet valve into chamber 118 from which the return fuel continues through the return flow conduit 50 back to the tank. The depression of the accelerator will force piston 120 of said pump 54 downwardly to force fuel through check valve 116 and through conduit 122 directly to the downstream chamber 76 of the load sensor.

The operation of the speed sensor 12 and load sensor 14 will be described separately from the fuel adjusting means 18 and in relation to a change in static engine operating conditions, that is, constant engine speed and load. Under said static operating conditions, the combined forces exerted by flyweights 64 and 66 and the fuel in chamber 36 is balanced by the force exerted by the fuel in chamber 34 and the return flow metering member 56 is maintained stationary at a distance away from orifice 48. In this static condition, the amount of fuel delivered to the rosette 76 is constant and is equal to the constant amount of fuel being delivered to the system by the pump less the constant amount of fuel being returned to the fuel tank through the return flow conduit 50. If this static condition represents the engine during normal driving speed, the pressure in chamber 40 has no noticeable effect on the operation of the unit and may be disregarded. It is only during idling and very low engine speeds that the pressure differential across diaphragm 32 becomes significant.

As the throttle valve 98 is moved to a more open position by the depression of the engine accelerator, an increase in manifold pressure is transmitted to the load sensor piston through conduit 90 and moves said piston down to thereby move the load metering needle 80 to a more open position with respect to the load metering orifice 78. The pressure differential existing across said orifice is consequently decreased as more fuel is allowed to flow into chamber 76. This decrease in pressure differential causes the flow through orifice 78 to deviate from the desirable flow which is substantially linear with respect to engine speed. To correct this condition and bring the pressure differential across said orifice up to a value where the flow of fuel therethrough is substantially linear to engine speed, the fuel pressure in speed chamber 34 and load sensor chamber 74 communicating therewith is increased. This increase in pressure is accomplished by moving the return flow metering member 56 closer to orifice 48 by the increased force transmitted by the flyweights 64 and 66 as the engine speed is increased and by the increased pressure in chamber 36 caused by the increased flow of fuel into the downstream chamber 76 of the load sensor. When the forces transmitted by said flyweights and the fuel in said chamber 36 once again balance the force transmitted in the opposite direction by the fuel in chamber 34, the flow of fuel through orifice 78 will be substantially linear to the speed of the engine and will correspond to the flow of air into the intake manifold which air flow is also substantially linear to engine speed.

Fuel adjusting means 18 comprises a first housing 124 having chambers 126 and 128 therein formed by said housing and a flexible diaphragm 130. Chamber 126 communicates with manifold 88 through conduit 132 to receive pressure change signals or fluctuations therefrom. Chamber 128 communicates with the atmosphere through check valve 143 and with chamber 136 in a second housing 138 through check valve 140, said check valves being urged to their closed position by springs 142 and 144 respectively. Check valve 134 is arranged to open in response to a decrease in pressure in chamber 128 and check valve 140 is arranged to close in response to said pressure decrease, and vice versa. A plunger 146 is secured to diaphragm or pressure responsive member 148 for movement therewith in response to pressure changes in chamber 136. Spring 150 urges diaphragm 148 back to its unbiased position as air compressed in chamber 136 bleeds off through aperture 152. Chamber 154 in housing 138 may be kept completely open to the atmosphere or may be only partially open thereto through a bleed aperture 156 should it be desired to further regulate the speed and extent of movement of diaphragm 148 by means of the air pressure in chamber 154. Plunger 146 is pivotally connected to a thrust arm 158 which arm is pivotally mounted on housing portion 26 and movable in slot 160 therein to abut shoulder 162 on member 56 to apply a force thereto in response to downward movement of diaphragm 148 and plunger 146. It would be obvious to one skilled in the art that other types and variations of linkages could interconnect member 56 and diaphragm 148 such as, for example, connecting said member 56 directly to diaphragm 148.

The functioning of fuel adjusting means 18 does not take place until the resonating condition mentioned above begins in the manifold. The engine speed at which this resonating condition begins depends essentially upon the aforementioned factors expressed in the equation $$L = \frac{72C}{N} \pm 3$$

and may also depend to a lesser degree upon air density temperature, fuel to air ratio, intake manifold contour, etc. For example, with 30 inch intake manifold pipes the resonating condition appears at enigne speeds of approximately 1600 to 4000 revolutions per minute and reaches maximum values at speeds of approximately 2800 to 3200 r.p.m. As the resonating condition begins the back and forth air movement within the manifold produces pressure variations in conduit 132 which are transmitted to chamber 126 and diaphragm 130. As the pressure decreases diaphragm 130 is sucked toward conduit 132 and draws air through check valve 134 into chamber 128. As the pressure increases due to a reversal of the air flow within the manifold the air trapped in chamber 128 is forced through check valve 140 by the pressure increase in chamber 126. The air flowing through check valve 140 into the chamber 136 urges diaphragm 148 and plunger member 146 downwardly to pivot arm 158 about its pivot point 159 on housing member 26 and causes said arm to abut shoulder 162 on metering member 56 to thereby urge said metering member to a more restricted position with respect to return flow orifice 48. An increased fuel flow to the engine will consequently result and compensate for the increased air flow to the cylinders. As the frequency and amplitude of the pulsations in the manifold increases diaphragm 130 will pump a correspondingly increased amount of air into chamber 136 which will cause arm 158 to urge metering member 56 to a still further restricted position with respect to orifice 48. This increase in pumping action by diaphragm 130 will continue until the peak of the resonance is obtained at which peak the output or torque of the engine will also be at a peak. As the speed of the engine is dropped to below the tuning range or is increased beyond the tuning range the pressure variations in the manifold will diminish and cause diaphragm 130 to become inactive. The air trapped in chamber 136 and urging plunger 146 downwardly will bleed off through aperture 152 and spring 150 will urge diaphragm 148 to a retracted position to relieve the adjusting force on metering member 56. Diaphragm 130 may be made comparatively large to diaphragm 148 in order to increase the sensitivity of adjusting means 18 to pressure variations in the manifold.

Figure 2:
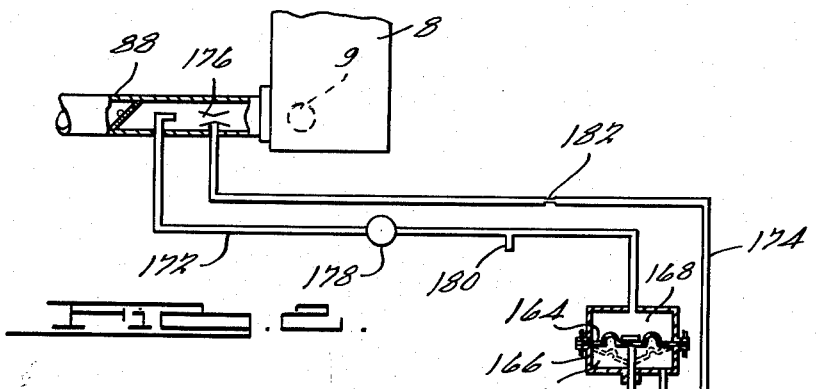
FIGURE 2 represents a view partly in section of a variation of the fuel adjusting means of FIGURE 1.

The variation of the adjusting means in FIGURE 2 comprises a diaphragm 164 secured in housing 166 which housing and diaphragm form chamber 168 and chamber 170. Chamber 168 communicates with manifold 88 through conduit 172 which extends into said manifold and opens to the leeward of the normal direction of air flow to the engine cylinder. A conduit 174 connects the chamber 170 to a venturi 176 located in said manifold 88 intermediate said conduit 172 and said engine cylinder. A check valve 178 located in conduit 172 permits air to flow one way from manifold 88 into chamber 168. A bleed means 180 in conduit 172 allows diaphragm 164 to return to a neutral position upon sessation of the air pulses in said manifold. A restriction 182 may be provided in conduit 174 to regulate the flow of air therethrough to chamber 170. A plunger 184 is connected to diaphragm 164 and is operatively linked to metering member 56 in the manner shown in FIGURE 1 to adjust the same.

In the operation of the fuel adjusting means in FIGURE 2, changes in direction of air flow in the manifold will transmit a substantially constant pressure through conduit 174 to chamber 170 since the pressure developed by a venturi is independent of direction of flow. A backward flow, however, away from the engine cylinder will impinge upon conduit 172 and force an additional quantity of air through check valve 178 into chamber 168 wherein a pressure increase will urge diaphragm 164 and plunger 184 downwardly to effect a shifting of metering member 56 in the manner described for the fuel adjusting means of FIGURE 1. Similarly to said adjusting means of FIGURE 1 pressure will bleed from chamber 168 to remove the adjusting force from member 56 when the engine speed passes out of the resonance tuning range.

Figure 3:
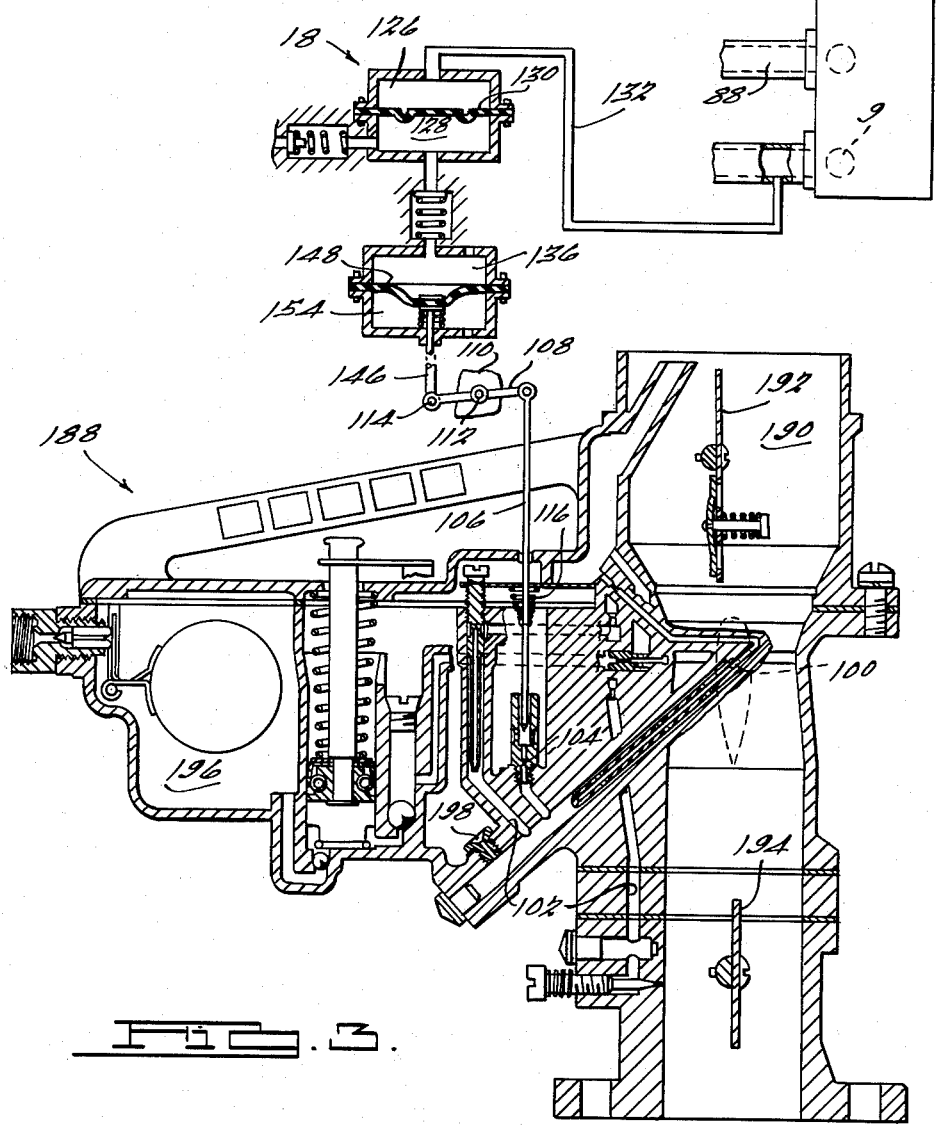
FIGURE 3 represents a view partly in section of a carburetor utilizing the fuel adjusting means of FIGURE 1.

Shown in FIGURE 3 is the combination of the fuel adjusting means 18 of FIGURE 1 with a standard downdraft type carburetor 188 adapted for supplying combustion mixtures to intake manifold conduits 88. This carburetor is comprised of the conventional features of main air intake passage 190, choke valve 192, throttle valve 194, fuel bowl 196, main fuel jet 198, venturi 100, idle fuel system 102, and a secondary enrichment valve comprised of jet 104 and needle 106. The needle 106 used to control the size of the jet 104 is pivotally connected in the present invention to a cross arm 108 which is in turn pivotally connected to a body portion or base 110 at 112 and to the plunger 146 of the unit 18 at 114. It is readily seen that as the pulsations in the particular intake manifold conduit connected to unit 18 increase in intensity the pumping action thereof on unit 18 will rotate arm 108 counterclockwise to draw needle 106 upwardly against spring 116 to thereby urge the enrichment jet 104 open to allow additional fuel to flow to the primary venturi 100. The unit 18 may be mounted on a base separate from the carburetor or may be installed on and made a part of the carburetor housing structure. It is noted that the plunger 146 of unit 18 could be connected directly to needle 106 to reduce the additional enrichment as the pulsations occur in the event that the carburetor employed is of the type which actually becomes over-enriched as air pulsations occur in the intake manifold.

Carburetor 188 may also be provided with the fuel adjusting unit shown in FIGURE 2 and the plunger 184 thereof may be connected to arm 108 at 114 or may be connected directly to needle 106 in the manner and for the purpose described above in the combination of unit 18 with the carburetor 188.

I claim:

1. In a fuel injection system for an internal combustion engine having an intake manifold, a fuel supply communicating with said manifold through a fuel feed conduit, fuel metering means located in said feed conduit and connected to said engine, said metering means being responsive to speed and load changes occurring in said engine to regulate the fuel flow through said feed conduit to said engine, and fuel adjusting means operatively connected to said metering means and communicating with said manifold, said fuel adjusting means being responsive to air pulsations in said manifold to adjust said metering means according to the pressure varying effect of said pulsations.

2. In a fuel injection system for an internal combustion engine having an intake manifold, a fuel supply communicating with said manifold through a fuel feed conduit, fuel metering means located in said feed conduit to control the flow of fuel therethrough to said engine, and fuel adjusting means connected to said metering means and communicating with said manifold, said fuel adjusting means being responsive to air pulsations in said manifold to adjust said metering means according to the frequency and amplitude of said pulsations.

3. In a fuel injection system for an internal combustion engine having an intake manifold, a fuel supply communicating with said manifold through a fuel feed conduit, fuel speed metering means located in said feed conduit and connected to a drive portion of said engine, said metering means being responsive to speed changes occurring in said engine to regulate the fuel flow through said feed conduit to said engine, and fuel adjusting means connected to said metering means and communicating with said manifold, said fuel adjusting means being responsive to changes in direction of air flow in said manifold to exert an adjusting force on said metering means.

4. In a fuel injection system for an internal combustion engine having an intake manifold, said manifold having a length in inches substantially equal to $$\frac{72C}{N} \pm 3$$

where N is the engine speed in revolutions per minute at which the engine power performance is to substantially peak and C is the velocity of sound in feet per second in air under the atmospheric temperature and pressure conditions at which the engine is to be operated, a fuel supply communicating with said manifold through a fuel feed conduit, fuel metering means in said feed conduit for regulating the flow of fuel to said engine, and fuel adjusting means connected to said metering means and communicating with said manifold, said fuel adjusting means being responsive to changes in direction of air flow in said manifold to exert an adjusting force on said metering means according to the frequency of said changes and the amplitude of pressure variations created thereby.

5. In a fuel injection system for an internal combustion engine having a ram type intake manifold, a fuel supply communicating with said manifold through a fuel feed conduit, fuel speed metering means located in said feed conduit and adapted to be connected to a drive portion of said engine, said metering means carrying a shiftable metering member, said member being shiftable in response to speed changes occurring in said engine to regulate the fuel flow through said feed conduit to said engine, and fuel adjusting means connected to said metering member and communicating with said manifold, said fuel adjusting means being responsive to air pulsations in said manifold to exert an adjusting force on said metering member.

6. In a fuel injection system for an internal combustion engine having a ram type intake manifold, a fuel supply communicating with said manifold through a fuel feed conduit, fuel speed metering means located in said feed conduit and adapted to be connected to a drive portion of said engine, said metering means carrying a shiftable metering member, said member being shiftable in response to speed changes occurring in said engine to regulate the fuel flow through said feed conduit to said engine, and fuel adjusting means having a pressure responsive member communicating with said intake manifold and movable in response to pressure changes occurring in said manifold, said pressure responsive member being connected to said metering member to exert a force thereon tending to shift said metering member to adjust the fuel flow to said engine in accordance with the frequency and amplitude of said pressure changes.

7. In a fuel injection system for an internal combustion engine having an intake manifold, a fuel supply communicating with said manifold through a fuel feed conduit, fuel metering means comprising a speed sensor and a load sensor located in said feed conduit and adapted to be connected to a drive portion and a manifold portion of said engine respectively, said metering means being responsive to speed and pressure changes occurring in these engine portions respectively to regulate the fuel flow through said feed conduit to said manifold, said speed sensor having a shiftable fuel metering member therein, and fuel adjusting means connected to said shiftable fuel metering member and communicating with said manifold, said adjusting means being responsive to changes in direction of air flow in said manifold to exert an adjusting force on said metering member tending to shift same to adjust the fuel flow to said engine in accordance with the frequency and amplitude of said changes in direction of air flow.

8. In a fuel injection system for an internal combustion engine having a ram type intake manifold, a fuel supply connected to said engine through a fuel feed conduit and adapted to supply fuel under pressure to said engine, fuel metering means comprising a speed sensor and a load sensor connected in series in said feed conduit, said speed sensor having a fuel metering orifice thereon communicating with said fuel feed conduit and said fuel supply and having a shiftable fuel metering member movable with respect to said orifice to regulate the flow of fuel therethrough, fuel adjusting means connected to said metering member and communicating with said manifold, said fuel adjusting means being responsive to pressure waves in said manifold to exert a force on said metering member proportional to the frequency and amplitude of said waves tending to urge said member to a different position with respect to said orifice, and a speed governor means in said speed sensor operatively connected to a drive portion of said engine and to said shiftable metering member and responsive to engine speed to shift said metering member with respect to said orifice to regulate the flow of fuel therethrough according to engine speed.

9. In a fuel injection system for an internal combustion engine having an intake manifold, a pressurized fuel supply communicating with said manifold through a fuel feed conduit, fuel metering means comprising a speed sensor and a load sensor located in said feed conduit and adapted to be connected to a drive portion and manifold portion of said engine respectively, said metering means being responsive to speed and pressure changes occurring in these engine portions respectively to regulate the fuel flow through said feed conduit to said manifold, said speed sensor having a return flow metering orifice communicating with said fuel supply and a return flow metering member shiftable with respect to said orifice, and fuel adjusting means connected to said return flow metering member and communicating with said manifold, said fuel adjusting means having a pump means responsive to pressure variations within said manifold to exert a force on said metering member tending to cause said member to shift with respect to said orifice to vary the fuel flow to said engine in accordance with the frequency and amplitude of said pressure variations.

10. In a fuel injection system for an internal combustion engine having an intake manifold, a pressurized fuel supply communicating with said manifold through a fuel feed conduit, fuel metering means comprising a speed sensor and a load sensor located in said feed conduit and adapted to be connected to a drive portion and manifold portion of said engine respectively, said metering means being responsive to speed and pressure changes occurring in these engine portions respectively to regulate the fuel flow through said feed conduit to said manifold, said speed sensor having a return flow metering orifice communicating with said fuel supply and a return flow metering member shiftable with respect to said orifice, and fuel adjusting means connected to said metering member and communicating with said manifold, said fuel adjusting means comprising a pressure responsive member communicating with said manifold portion across a check valve and being connected through suitable linkage to said metering member, said pressure responsive member being responsive to pressure variations within said manifold to exert a force on said metering member urging it to shift with respect to said orifice to vary the fuel flow to said engine in accordance with the frequency and amplitude of said pressure variations.

11. In a fuel injection system for an internal combustion engine having an intake manifold and a pressurized fuel supply communicating with said manifold through a fuel feed conduit, fuel metering means comprising a speed sensor and a load sensor located in said feed conduit and adapted to be connected to a drive portion and manifold portion of said engine respectively, said metering means being responsive to speed and pressure changes occurring in these engine portions respectively to regulate the fuel flow through said feed conduit to said manifold, said speed sensor having a return flow metering orifice communicating with said fuel supply and a return flow metering member shiftable with respect to said orifice, and fuel adjusting means connected to said metering member and communicating with said manifold, said fuel adjusting means comprising a first flexible diaphragm communicating on one side with said manifold and on the other side with an air inlet check valve and an air outlet check valve, a second flexible diaphragm communicating on one side with said outlet check valve and on the other side with said metering member through suitable linkage means and bleed means interposed between said outlet check valve and said second diaphragm for returning said second diaphragm to its inactive position when a non-pulsating condition exists in said manifold.

12. In a fuel injection system for an internal combustion engine having an intake manifold, a pressurized fuel supply communicating with said manifold through a fuel feed conduit, fuel metering means comprising a speed sensor and a load sensor located in said feed conduit and adapted to be connected to a drive portion and a manifold portion of said engine respectively, said metering means being responsive to speed and pressure changes occurring in these engine portions respectively to regulate the fuel flow through said feed conduit to said manifold, said speed sensor having a return flow metering orifice communicating with said fuel supply and a return flow metering member shiftable with respect to said orifice, and fuel adjusting means connected to said metering member and communicating with said manifold, said fuel adjusting means comprising a flexible diaphragm communicating on one side with said manifold through a conduit, said conduit extending into said manifold and opening leeward of the incoming air flow in said manifold, said diaphragm communicating on the other side with said manifold, said other side of said diaphragm being connected to said metering member through suitable linkage means to exert an adjusting force on said metering member in response to a reverse flow of air in said manifold.

13. In a fuel injection system for an internal combustion engine having an intake manifold, a pressurized fuel supply communicating with said manifold through a fuel feed conduit, fuel metering means comprising a speed sensor and a load sensor located in said feed conduit and adapted to be connected to a drive portion and a manifold portion of said engine respectively, said metering means being responsive to speed and pressure changes occurring in these engine portions respectively to regulate the fuel flow through said feed conduit to said manifold, said speed sensor having a return flow metering orifice communicating with said fuel supply and a return flow metering member shiftable with respect to said orifice, and fuel adjusting means connected to said metering member and communicating with said manifold, said fuel adjusting means comprising a flexible diaphragm communicating on one side with said manifold through a conduit, said conduit extending into said manifold and opening leeward of the incoming air flow in said manifold, check valve means in said conduit allowing air to pass only toward said diaphragm, bleed means in said conduit for restoring said diaphragm to its inoperative position as pulsations in said manifold cease, said diaphragm communicaitng on the other side with said manifold through conduit means and to said metering member through suitable linkage means.

14. In a fuel injection system for an internal combustion engine having a ram type intake manifold, a pressurized fuel supply communicating with said manifold through a fuel feed conduit, fuel metering means comprising a speed sensor and a load sensor located in said feed conduit and adapted to be connected to a drive portion and a manifold portion of said engine respectively, said metering means being responsive to speed and pressure changes occurring in these engine portions respectively to regulate the fuel flow through said feed conduit to said manifold, said speed sensor having a return flow metering orifice communicating with said fuel supply and a return flow metering member shiftable with respect to said orifice, fuel adjusting means connected to said metering member and communicating with said manifold, said fuel adjusting means comprising a flexible diaphragm communicating on one side with said manifold through a first conduit, said conduit extending into said manifold and opening leeward of the incoming air flow in said manifold, said diaphragm communicating on the other side with said manifold through a second conduit, said second conduit extending into said manifold and opening into a venturi tube positioned in said manifold, said diaphragm being operatively linked to said metering member to move said member relative to said return flow metering orifice in response to changes in direction of air flow in said manifold.

15. In a fuel injection system for an internal combustion engine having a ram type intake manifold, a pressurized fuel supply communicating with said manifold through a fuel feed conduit, fuel metering means comprising a speed sensor and a load sensor located in said feed conduit and adapted to be connected to a drive portion and a manifold portion of said engine respectively, said metering means being responsive to speed and pressure changes occurring in these engine portions respectively to regulate the fuel flow through said feed conduit to said manifold, said speed sensor having a return flow metering orifice communicating with said fuel supply and a return flow metering member shiftable with respect to said orifice, fuel adjusting means connected to said metering member and communicating with said manifold, said fuel adjusting means comprising a flexible diaphragm communicating on one side with said manifold through a first conduit, said first conduit extending into said manifold and opening leeward of the incoming air flow in said manifold, said diaphragm communicating on the other side of said manifold through a second conduit, said second conduit extending into said manifold and opening into a venturi tube positioned in said manifold, a restriction in said second conduit tending to decrease the rate of flow of air therethrough to retard the rate of movement of said diaphragm, said diaphragm being operatively linked to said metering member to move said member relative to said return flow metering orifice in response to changes in direction of air flow in said manifold.

16. In a fuel system for an internal combustion engine having an intake manifold and a fuel supply communicating with said manifold through a fuel feed conduit, fuel metering means located in said feed conduit to control the flow of fuel therethrough to said engine, said fuel metering means comprising a valve portion and a manifold pressure pulsation responsive pumping portion, said pumping portion being adapted to substantially convert the pressure pulsations of the manifold into a cumulative pressure for adjusting said valve portion of said metering means according to the amplitude and frequency of said pulsations.

17. In a fuel carburetion system for an internal combustion engine having an intake manifold and a fuel supply communicating with said manifold through a fuel feed conduit, fuel metering jet means located in said feed conduit to control the flow of fuel therethrough to said engine, said jet means comprising a valve portion and a manifold pressure pulsation responsive pumping portion, said pumping portion being adapted to substantially convert the pressure pulsations of the manifold into an additive pressure for adjusting said valve portion of said jet means according to the amplitude and frequency of said pulsations.

References Cited in the file of this patent

UNITED STATES PATENTS

| | | |
|---|---|---|
| 2,871,841 | Goodridge et al. | Feb. 3, 1959 |
| 2,871,844 | Elliott et al. | Feb. 3, 1959 |
| 2,882,879 | Dolza | Apr. 21, 1959 |